United States Patent Office 3,050,541
Patented Aug. 21, 1962

3,050,541
MANUFACTURE OF ALKYL ALUMINUM
COMPOUNDS
Merle L. Gould, Baton Rouge, La., assignor to Ethyl
Corporation, New York, N.Y., a corporation of Delaware
No Drawing. Filed July 30, 1958, Ser. No. 751,891
6 Claims. (Cl. 260—448)

This invention relates to the manufacture of ethyl aluminum compounds, such as triethyl aluminum. More particularly, the invention relates to a catalyzed process employing elemental aluminum as a feed material.

It has heretofore been disclosed that triethyl aluminum compounds can be produced by appropriate treatment of elemental aluminum. Particularly, as disclosed in the Redman Patent 2,787,626, a highly effective way of converting elemental aluminum to, eventually, triethyl aluminum is to treat such elemental aluminum with hydrogen under elevated pressure in the presence of liquid triethyl aluminum. It is believed that the joint presence of these three reactants results in some as yet unexplained disproportionation to form a material having both alkyl and hydrogen bonds on the aluminum compounds present. In effect, then, this hydrogenation operation is the formation of aluminum-hydrogen bonds in molecules also having alkyl substituents.

Reaction mixtures so formed are susceptible to further treatment with ethylene under appropriate pressure and at reaction temperatures, to convert the aluminum-hydrogen bonds to aluminum alkyl bonds. As a result, additional and direct formation of triethyl aluminum results.

The general process have described—viz. the hydriding of aluminum in the presence of triethyl aluminum to form a liquid reaction medium comprising diethyl aluminum hydride or similar materials, is quite operable and readily produces the desired intermediate for subsequent, or even concurrent, treatment with ethylene to form triethyl aluminum. However, the process as generally described has been found limited in application by several factors which tend to discourage commercial operation. These limitations are definitely recognizable as discrete factors or obstacles to the most efficient production. First, the aluminum charged, in order to effectively react as already described, must be active or sensitized for the said reaction. This means, simply, that nascent or unobscured aluminum metal surfaces must be available for the reaction to occur. Hence, when commercial sources of aluminum are provided as a sole feed in batch operations, reactions do not occur for relatively lengthy periods. This difficulty is attributed to the existence of a thin film of aluminum oxide on the surface of commercially available particles. It is known that such oxide films form practically instantaneously upon exposure of aluminum metal to atmospheric oxygen. However, despite the existence of such a bar to initial reaction, it is further found that the lack of activity of such aluminum can be readily circumvented by several techniques. The most effective of such techniques is to provide a hold-up of aluminum, and desirably a substantial excess at all times, so that the residence time of the aluminum as freshly fed in a reaction system is more extended than is required for the liquid phase present. In other words, in a cyclic operation, a heel of unreacted aluminum is retained from one to successive cycles at all times. It is found that the aluminum so retained is fully activated, that is, that it is susceptible to reaction immediately upon application of hydrogen pressure in the reaction environment. A second and even more significant obstacle to commercial acceptance of the direct process above described, is the relative slowness of reaction once it is initiated. In other words, even though the aluminum present is activated, and reacts with hydrogen and triethyl aluminum present, the rate of reaction is frequently found so modest that commercial effectiveness (as exhibited by production rate for a given volume of reaction space) is significantly limited. The present invention is directed to this latter deficiency of the prior art.

The general object of the present invention, then, is to provide a new and highly effective process for the production of trialkyl aluminum compounds by the concurrent or sequential operations of hydriding aluminum in the presence of triethyl aluminum and treating the resultant material with ethylene to form triethyl aluminum, thus converting the aluminum charged. Another object is to most effectively utilize, in such a process, active forms of aluminum metal. A more particular object is to substantially reduce the period of time required for unit take-up or reaction of hydrogen in this portion of the process. An additional object is to permit operation at lower pressures, without any penalty in increase in reaction time. A further object is to provide a new and improved operation of the general type discussed which is more readily susceptible to control and to continuous operations. Other objects will appear hereinafter.

The process of the present invention comprises providing an accelerated hydrogenation step in the formation of ethylated aluminum products, especially triethyl aluminum. In other words, in a reaction system including activated aluminum, a liquid phase comprising triethyl aluminum, and hydrogen supplied under supra-atmospheric pressure, the rate of hydrogen take up is accelerated by a minor and catalytic amount of a reactive metal component selected from the group consisting of an alkali metal, an alkaline earth metal, an alkali metal hydride, and an alkaline earth metal hydride. It is found that the presence of minor quantities of these materials result in substantial acceleration of the hydrogen reaction rate as shown hereafter. In carrying out the process, proportions of the defined accelerator are provided in the proportions of, usually, about 0.02 gram mole per gram mole of the liquid ethyl aluminum materials present, or higher, although in some instances even lower concentrations are not outside the scope of the improvement. The effective accelerator can be provided in several different forms. Thus, in the case of the lower atomic number alkali metals, it is convenient to introduce them as a dribble of molten metal, because of the relatively low melting points, especially in the case of sodium. Alternatively, the alkali metals readily form into dispersions in light-weight hydrocarbon liquids, and these form convenient additives materials. Alternatively, the metals may be added as sub-divided solids, sub-divided if desired, or as small round shapes. The hydrides of the alkali metals, and the hydrides of the alkaline earth metals when employed, also can be finely sub-divided in the presence of a minor quantity of supporting medium of hydrocarbon liquid and introduced as a paste or a slurry. Alternatively, the hydride materials, when employed, can be provided as sub-divided dry solids fed in the initial formation of a reaction system. In operations characterized by cyclic and/or continuous types of processing, it will be found desirable to introduce the accelerating material either continuously, or in occasional small quantities to assure that an active form of the accelerator is provided at all times during a hydrogen reaction for the desired effect.

The conditions of operations are not necessarily altered to employ the present improvement. In other words the temperatures and pressures, and relative amount of aluminum and liquid medium comprising triethyl aluminum can generally be about the same as would be employed without the present accelerated hydrogenation operation.

On the other hand, the present process permits very effective operation at low pressures, that is, the same production rate at low pressures as heretofore required very high pressure. Typical conditions, using the formation of triethyl aluminum as exemplification are, in a batch type operation, a reaction temperature of about 140° C., and aluminum powder in an active state, provided in the proportions of at least one gram atom to one gram mole of alkylated aluminum present in the system. Ordinarily, some supra-atmospheric pressure is quite desirable in order to provide a reasonable degree of contacting. Supra-atmospheric pressures of hydrogen, of up to usually 5,000 pounds per square inch, are frequently desirable. The operating temperatures similarly are subject to appreciable latitude of, for example, from 75 to about 200° C.

The particular advantages of the process and the details of its operation and employment will be readily understood from the working examples below and detailed description hereafter.

In carrying out the process, one typical method is to process as follows. A charge to a reaction vessel of liquid triethyl aluminum amounting to 100 parts by weight is introduced. Appropriate provisions are taken to assure that the triethyl aluminum is not exposed to dampness or to oxygen. This is readily done by blanketing the contents and interior of the vessel with an inert gas such as nitrogen or helium. In addition to the triethyl aluminum charged, about 50 parts by weight of finely comminuted aluminum powder, which is of an active character, is introduced. The reaction vessel is provided with mechanism for vigorously agitating the contents as required. In addition, external means are provided to allow raising its temperature and maintaining it at a desired level. Upon completion of the foregoing charge, the reaction zone or vessel is sealed, and hydrogen gas is fed in and a pressure of about 1,000 pounds per square inch gauge is established. At the same time, the temperature of the system is raised to from 130 to 150° C. Reaction starts substantially immediately and hydrogen take-up rate is continuous for an extended period, the hydrogen taken up providing conversion of the aluminum materials in the reaction zone to diethyl aluminum hydride, $(C_2H_5)_2AlH$. In this standard type operation, the aluminum was introduced in the proportions or weight ratio corresponding to a ratio of 2 atoms of aluminum to one gram mole of triethyl aluminum. This corresponds to a stoichiometric proportion of about 300 percent excess of theoretical requirement. The conversion to a diethyl aluminum hydride is thus limited by the quantity of triethyl aluminum present, and it is found that, in such a batch reaction, that conversion seldom exceeds about 80 percent of the theoretical degree of completion. The hydrogen take-up is substantially at a uniform rate during a large portion of the reaction, but as the quantity of triethyl aluminum present is decreased, the rate also decreases. At the conclusion of such a cyclic or batch operation, the liquid phase can be separated from the excess aluminum and unreacted solids and passed to separate processing. Alternatively, the above described hydrogenation step can be followed by an alkylation step in the same reaction zone, that is, the application of appreciable ethylene pressure to form aluminum ethyl radicals, thereby producing the desired additional formation of triethyl aluminum.

*Example I*

A charge of 100 parts of previously prepared triethyl aluminum, $(C_2H_5)_3Al$, was introduced to a reaction zone, and in addition approximately 24 parts of aluminum, this corresponding to one atomic equivalent of aluminum to a gram mole of triethyl aluminum. Roughly one-half part of previously prepared sodium hydride, in the form of a finely divided powder wetted with an alkane liquid hydrocarbon, was added to the charge. The reaction zone was then sealed, and hydrogen pressure equivalent to 1,000 pounds gauge pressure added while heating to 140° C. The hydrogen was rapidly absorbed, and this absorption continued for a respectable period of time, the total absorption upon termination of the operation amounted to hydrogen equivalent to converting approximately two-thirds of the triethyl aluminum to diethyl aluminum hydride.

The rate of hydrogen take-up was substantially linear with time for a large fraction of the reaction period, and after approximately one-half of the triethyl aluminum had been reacted the rate of absorption decreased. During the steady state operation, the rate of absorption corresponded to 0.0080 gram mole of hydrogen per minute, per gram mole of triethyl aluminum originally charged.

Upon completion of the reaction, a portion of the liquid phase was removed (after cooling the reaction mixture and venting excess pressure) and analyzed, showing that the above mentioned yield of diethyl aluminum hydride had been achieved.

When the operation as above described is carried out with the same materials, but with no sodium hydride or other catalyst as is employed according to the present process, the conversion proceeds adequately, but the rate of reaction is appreciably lower. Thus, in a series of operations using the same proportions of active aluminum and triethyl aluminum initially charged, the same hydrogen pressure and temperature of reaction, an average hydrogen rate of 0.0052 was achieved. Accordingly, it is clear that the operation of Example I above resulted in a reaction rate of 154 percent of the corresponding rate in the absence of sodium hydride.

As previously mentioned, the relative proportions of the accelerating catalysts of the present invention are not highly critical. Thus the following example illustrates the use of appreciably higher sodium hydride concentrations, but using a lower quantity of aluminum metal.

*Example II*

In this operation, the procedure of Example I was repeated, except that only 16 parts of active aluminum comminuted metal was initially charged, this corresponding to 1.3 times the theoretical requirement, or 30 percent excess aluminum. In addition, sodium hydride was again added at the start of the operation to the extent of 2.1 parts per 100 parts of triethyl aluminum. The rate of hydrogen take-up was 175 percent of the standard rate mentioned above. This operation shows, that despite a relatively small excess of aluminum, the accelerators of the present invention result in great improvement in reaction rate.

*Example III*

The procedure of Example I was repeated, but the sodium hydride concentrations was raised to 3.2 parts per 100 parts of triethyl aluminum. The rate of hydrogen reaction was 230 percent of the standard rate.

*Example IV*

When the same procedure as employed in Example I was used, except that the sodium hydride concentration was raised again, to 7.8 parts per 100 parts of triethyl aluminum, the rate of hydrogen reaction was 600 percent of the base rate above cited.

*Example V*

As already discussed, effective catalysts for the present invention include the anhydrides of the alkaline earth metals, as shown in this example. The procedure of Example III is repeated, except that instead of providing sodium hydride as a catalyst, 2.8 parts of calcium hydride, $CaH_2$, are charged. A comparable increase in the hydrogen up-take rate as experienced in Example III is achieved.

The following example illustrates one of the embodiments of the process of the present invention wherein the desired catalytic effect is provided by feeding the elemental metal.

*Example VI*

The procedure of Example III was again generally followed, except that instead of the addition of sodium hydride as a catalyst, about three parts of sodium metal was provided. A substantial increase, amounting to a raise of 300 percent, of the hydrogen up-take rate was encountered.

*Example VII*

When the sodium employed in Example VI above is replaced with corresponding amounts of potassium, calcium, magnesium or lithium, similar significant improvements in hydrogen up-take are provided.

The product system obtained from any of the foregoing examples comprises a mobile liquid phase and minor amounts of unreacted aluminum, the proportion being dependent upon the initial quantity charged. The liquid phase can be employed as such for various purposes, representing as it does a soluble readily available aluminum organometallic material. Ordinarily, a typical composition of the product liquid is as follows:

| | Weight percent |
|---|---|
| Diethyl aluminum hydride | 65 |
| Triethyl aluminum | 34 |
| Other, including aluminum ethoxide | 1 |

Very frequently, the ultimate product desired is a substantially pure triethyl aluminum liquid. In such cases, the liquid, or if desired the heterogenous product mixture including solids not yet reacted, can be treated by pressurizing with a separate stream of ethylene, which results in the addition of ethylene to the aluminum-hydrogen bonding of the diethyl aluminum hydride component of the liquid, thereby forming triethyl aluminum according to the following equation:

$$(C_2H_5)_2AlH + C_2H_4 \rightarrow (C_2H_5)_3Al$$

As heretofore indicated, the present improvement is readily applicable in the direct formation of triethyl aluminum by a single stage process. By this is meant that, instead of treating an initial triethyl aluminum liquid with hydrogen to form a partly hydrided liquid product, the hydrogen treatment may be accompanied by a joint feed of an ethylene component. In such cases, the following reactions are occurring simultaneously:

$$\frac{2(C_2H_5)_3Al + 3H_2 + Al \rightarrow 3(C_2H_5)_2AlH}{2}$$

$$3(C_2H_5)_2AlH + 3C_2H_4 \rightarrow 3(C_2H_5)_3Al$$

It is seen from the foregoing equation, that if considered occurring concurrently, that ethylene and hydrogen would be fed with the ethylene in the proportions of roughly about 2 moles to 1 mole of hydrogen. In practice it is found that an ethylene:hydrogen mole ratio of from 1.5 to 2.5:1 is quite satisfactory. Investigation of this joint feed type of operation, and comparison of the individual reactions thereof, shows that the first reaction, viz. the treatment of triethyl aluminum, hydrogen and aluminum is much slower than the addition of ethylene to the diethyl aluminum hydride. Hence, the present improvement of accelerating the hydrogenation step is particularly beneficial in providing a balanced process. A typical illustration of such a joint feed operation is shown by the following example.

*Example VIII*

A reaction vessel is charged with a liquid solid reaction system consisting of a liquid phase and solid aluminum powder, in approximately equal weight proportions. The liquid phase is a commercial grade of triethyl aluminum, containing several percent diethyl aluminum hydride and minor amounts of aluminum ethoxide. Sodium hydride was introduced in the proportions of about 2 percent by weight of the liquid phase. The system is heated to 140° C. with vigorous agitation. A mixed stream of hydrogen and ethylene gas, in roughly proportions of 2 moles of ethylene to one of hydrogen, is fed to the reactor at a total pressure of 500 pounds per square inch gauge. Reaction occurs smoothly and a high yield of triethyl aluminum is provided.

When the foregoing operation is repeated, except that the sodium hydride is omitted, it is found that a pressure of about 1000 pounds is required to provide a comparable rate. It is thus seen that, according to the present method, substantial savings in equipment investment are possible, through operating at low pressures with no loss in throughput or production.

When sodium metal, calcium metal, calcium hydride, magnesium hydride, or the other catalysts of the present improvement are substituted for the sodium hydride employed in Example VIII above, similar significant improvements as demonstrated above are provided.

From the foregoing description and examples, it will be clear that the benefits of the present process can be attained in a wide variety of conditions. Thus, temperature, pressures of operation, agitation, relative proportions of initially charged materials in batch reactions or during reaction, are susceptible to substantial variation, as discussed more fully below. Generally, the preferred conditions are applicable in both the two stage type of operation (viz., formation of an ethyl aluminum hydride firstly followed by a second stage comprising the ethylation of the aluminum hydrogen bonds thereof) and in the single stage operation (wherein the reaction with hydrogen and the ethylation of aluminum hydrogen bonds with ethylene are carried out concurrently).

With respect to pressure of operation, as already indicated, in the two-stage type of operation, hydrogen pressures in the first stage of slightly above atmospheric to 5,000 pounds per square inch gauge or even higher are eminently suitable. In the single stage operation, wherein mixed or separate streams of hydrogen and ethylene are fed concurrently, the same criteria is applicable, although generally a lower hydrogen partial pressure is quite satisfactory, because the diethyl aluminum hydride formed is substantially immediately converted to triethyl aluminum product. In the first stage of two stage operations, it is found that the higher hydrogen pressures increase ultimate degree of conversion of the triethyl aluminum initially present to diethyl aluminum hydride. As already pointed out, this factor is not of particular consequence in the single stage type of operation wherein triethyl aluminum is the desired material.

As to the temperature of operation, it is also found that lower temperatures appear to expedite the ultimate degree of conversion in the first stage of operation, and in addition appear to benefit the ethylation reaction, although this portion of an overall process to make triethyl aluminum is of no criticality or it is not a limiting factor in the process. The temperatures of operation can be, generally from slightly above ambient temperatures to even as high as above 200° C., although triethyl aluminum decomposes fairly rapidly at 230° C. Hence, a preferred range of temperatures of operation are from 100 to 200° C., and an even more preferred embodiment utilizes temperatures of from 120 to 160° C.

As already discussed, the aluminum provided to the process should be comminuted to a relatively fine state of subdivision. It is found, upon testing in a series of operations utilizing uniform size distribution of aluminum particles, that the absolute rate of hydrogen take-up is benefited by increases of relative aluminum proportions, even up to quantities of as much as 15 theories of that theoretically required. However, attempts to achieve this high rate of take-up by this means are not practical, because of the relative bulk of aluminum metal powder which is thus present in the reaction zone and which imposes an undue burden on the agitating equipment necessary. Hence, generally, it is preferred to operate from an aluminum requirement of from about 5 theories to about 10 or 11 theories. The particle size of aluminum desirably is of the particle size range of approximately 100 percent passing through openings of 74 microns in size.

Vigorous agitation of the reaction system is necessary. A typical range of agitation power input is from about 0.01 horsepower per gallon of reaction system to about 0.1 horsepower.

The desired reactions are accompanied by a small amount of undesired side reactions. Vigorous agitation and therefore efficient contacting, relatively short contact time in the reaction zone, moderate temperature ranges and other factors can be utilized to prevent these undesired side reactions. The side reactions, which tend to decrease the yield according to the desired route include the formation of higher alkylated aluminum product materials, such as butyl aluminum compounds, and in addition, it is found that a certain small amount of triethyl aluminum reacts with hydrogen directly to form diethyl aluminum hydride and ethane. Of course, diethyl aluminum hydride can be recaptured to form triethyl aluminum by reaction with ethylene, but there is no net gain because ethane is formed and this is not reacted with the components present.

Having fully described the process of the invention, what is claimed is:

1. In a process of forming an ethyl aluminum compound by treating aluminum with hydrogen in the presence of liquid triethyl aluminum, said aluminum being active and susceptible to said treatment, the improvement comprising supplying an active metal component to said treatment in the proportions of from about 0.02 to 0.37 gram equivalent per gram mole of the triethyl aluminum, said active metal component being selected from the group consisting of the alkali metals, alkaline earth metals, alkali metal hydrides and alkaline earth metal hydrides, and carrying out said hydrogen treatment at a supra-atmospheric pressure of up to about 5,000 pounds per square inch and at a temperature of from 75 to 200° C.

2. The process of claim 1 further defined in that the active metal component is sodium.

3. The process of claim 1 further defined in that the active metal component is sodium hydride.

4. The process of claim 1 further defined in that the active metal component is calcium.

5. In a process of forming triethyl aluminum comprising treating with hydrogen aluminum and triethyl aluminum, said aluminum being active and susceptible to said treatment, and forming an ethyl aluminum hydride thereby, and then reacting said ethyl aluminum hydride with ethylene, the improvement comprising adding to the hydrogenation step sodium hydride is proportions of from 0.02 to about 0.37 gram mole per gram mole of the triethyl aluminum to accelerate the hydrogenation and carrying out said hydrogenation reaction at a supra-atmospheric pressure of up to about 1,000 pounds per square inch and at a temperature of from about 100 to 200° C.

6. In a process of forming triethyl aluminum comprising treating with ethylene and hydrogen aluminum and triethyl aluminum, said aluminum being active and susceptible to said treatment, the improvement comprising adding sodium to said reaction, in proportions of from 0.02 to 0.37 gram atom per gram mole of the triethyl aluminum to accelerate the rate of hydrogen reaction, and carrying out said reaction at a supra-atmospheric pressure of up to about 1,000 pounds per square inch and at a temperature of from about 120 to 160° C.

References Cited in the file of this patent

UNITED STATES PATENTS

| 2,787,626 | Redman | Apr. 2, 1957 |
| 2,892,738 | Dobratz | June 30, 1959 |

FOREIGN PATENTS

| 770,707 | Great Britain | Mar. 20, 1957 |

OTHER REFERENCES

Blitzer et al.: German application, Ser. No. 10,906 IVb/120, printed Aug. 30, 1956 (Kl. 20 G2603), 3 pp. spec., no dwg.